United States Patent
Freeman

(10) Patent No.: US 6,267,800 B1
(45) Date of Patent: Jul. 31, 2001

(54) PROCESS FOR PRODUCING COBALT METAL POWDER FROM NICKEL-COBALT SULPHIDES

(75) Inventor: Gavin Kerry Wyllie Freeman, Sherwood Park (CA)

(73) Assignee: Sherritt International Corporation, Fort Saskatchewan (CA)

( * ) Notice: Subject to any disclaimer, the term of this patent is extended or adjusted under 35 U.S.C. 154(b) by 0 days.

(21) Appl. No.: 09/547,022

(22) Filed: Apr. 11, 2000

(51) Int. Cl.[7] .................... C22B 23/00; C01G 51/00; C01F 11/00
(52) U.S. Cl. .................. 75/711; 75/717; 423/141; 423/145; 423/150.1; 423/150.5; 423/165
(58) Field of Search ................ 423/141, 145, 423/150.1, 150.5, 165; 75/711, 717

(56) References Cited

U.S. PATENT DOCUMENTS

| | | |
|---|---|---|
| 2,412,890 | 12/1946 | Jones et al. . |
| 2,576,314 | 11/1951 | Forward . |
| 2,647,819 | 8/1953 | McGauley . |
| 2,694,005 | 11/1954 | Schaufelberger . |
| 2,694,006 | 11/1954 | Schaufelberger . |
| 2,716,591 | 8/1955 | Thomsen . |
| 2,767,054 | 10/1956 | Schaufelberger . |
| 2,767,055 | 10/1956 | Schaufelberger . |
| 2,822,264 | 2/1958 | Sherritt . |
| 3,493,365 | 2/1970 | Pickering et al. . |
| 3,933,976 | * 1/1976 | Nikolic et al. ............ 423/145 |
| 3,967,957 | 7/1976 | Fonseca . |
| 4,024,218 | 5/1977 | McKay et al. . |
| 4,067,952 | 1/1978 | Pittie et al. . |
| 4,108,640 | 8/1978 | Wallace et al. . |
| 4,118,221 | 10/1978 | Ettel et al. . |
| 4,280,988 | 7/1981 | Subramanian et al. . |
| 4,600,435 | 7/1986 | Wiegers et al. . |
| 5,332,560 | 7/1994 | Kruesi . |
| 5,468,281 | 11/1995 | Kerfoot et al. . |
| 5,599,514 | 2/1997 | Gardano et al. . |

OTHER PUBLICATIONS

"The Winning of Nickel", J.R. Boldt, Jr. (Ed.), Toronto, Longmans, Canada Limited, 1967, no month, pp. 299–314.

* cited by examiner

Primary Examiner—Steven Bos
(74) Attorney, Agent, or Firm—Arne I. Fors

(57) ABSTRACT

A process for producing cobalt metal powder from nickel-cobalt sulphides wherein said nickel-cobalt sulphides are leached in an ammoniacal ammonium sulphate solution under an elevated pressure of an oxygen bearing gas, at a temperature of at least 80° C., with an effective ammonia to metals mole ratio in the range of 5:1 to 6.5:1 to oxidize the nickel and cobalt sulphides to sulphates, and to produce an ammoniacal leach liquor in which dissolved cobalt is predominantly in the (III) oxidation state, and an ammoniacal ammonium sulphate leach residue containing a cobalt (III) hexammine sulphate-calcium sulphate double salt. The improvement comprises repulping the ammoniacal ammonium sulphate leach residue, containing the cobalt (III) hexammine sulphate-calcium sulphate double salt, with a solution containing an effective amount of ammonium carbonate to dissolve the cobalt (III) hexammine sulphate in the repulp leach liquor and precipitate calcium carbonate; and separating the repulp leach liquor containing cobalt (III) hexammine sulphide from the repulp leach residue containing calcium carbonate.

9 Claims, 1 Drawing Sheet

PROCESS FOR PRODUCING COBALT METAL POWDER FROM NICKEL-COBALT SULPHIDES

BACKGROUND OF THE INVENTION (i) Field of the Invention

The invention relates to an improved hydrometallurgical process for the recovery of cobalt and nickel from nickel cobalt sulphides. More specifically, the invention relates to the separation of cobalt and nickel from an ammoniacal ammonium sulphate leach liquor to produce a substantially nickel-free cobalt solution from which recovery of high purity cobalt metal may be obtained and most particularly, to the treatment of the ammoniacal leach residue to obtain recovery of cobalt metal values contained therein and thus obtain overall enhanced cobalt recovery.

(ii) Description of the Related Art

A hydrometallurgical process for the treatment of nickel-cobalt-copper sulphide concentrates and mattes to produce high grade nickel and cobalt powders has been in commercial operation for many years. In this process, which is described in the publication, "The Winning of Nickel", J. R. Boldt, Jr. (Ed), Toronto, Longmans, Canada Limited, 1967, pages 299 to 314, the nickel sulphide feed materials are leached in ammoniacal ammonium sulphate solution, under elevated air pressure, in horizontal autoclaves. The metals, nickel, cobalt and copper are dissolved as metal amine complex ions. Iron is oxidized to insoluble haematite, and sulphide sulphur is partially oxidized to form a range of unsaturated sulphur anions which remain in the leach solution. The haematite residue is filtered off and discarded, and the leach solution is treated to remove copper, to partially remove the ammonia, and to oxidize the sulphur anions to sulphate. The purified solution, which contains about 60 g/L Ni and 1 g/L Co, is then treated with hydrogen under elevated pressure and temperature to precipitate nickel selectively as the metal powder. The cobalt remains in the reduced solution which contains about 1 g/L Ni and 1 g/L Co. The residual metals are then precipitated using hydrogen sulphide to produce a mixed nickel cobalt sulphide which forms the feed to the cobalt refining process.

The recovery of cobalt, in this nickel refining process, is much lower than that of nickel, as a result of the adsorption of cobalt, by the iron oxide leach residue. Furthermore, the selectivity of the reduction process, for nickel, depends on the maintenance of a low level of cobalt in the purified leach solution. It is only possible to produce nickel powder meeting the market specifications for cobalt, if the Ni:Co ratio is maintained above about 20:1. It will be appreciated, therefore, that this nickel refining process is not economically effective for the treatment of nickel feed materials with high cobalt content, since significant losses of cobalt to the leach residue and to the nickel powder product will be incurred.

A commercial cobalt refining process based on the soluble cobaltic pentammine process for separating nickel from cobalt, was operated in conjunction with the above nickel refining process. This process was based on U.S. Pat. Nos. 2,694,005; 2,694,006; 2,767,054 and 2,767,055 to Schaufelburger. In the refining process mixed nickel-cobalt sulphides with a typical Ni:Co ratio of 1:1 were first leached at elevated air pressure and temperature in dilute sulphuric acid solution to dissolve the nickel and cobalt and oxidize the sulphide to sulphate. The acidic leach solution, containing cobalt and nickel sulphates, was purified to remove iron and trace metals such as Cu, Cd and Zn. Ammonia was then added to neutralize the free acid and to adjust the ammonia to metals mole ratio to form the pentammine ions of divalent nickel and cobalt. The solution was then treated with air under pressure in an autoclave, to oxidize the cobalt (II) pentammine ion to the cobalt (III) pentammine ion. The nickel (II) pentammine ion is not oxidized under these conditions. The oxidized solution was then treated in a two stage process with concentrated sulphuric acid to selectively precipitate nickel as the nickel ammonium sulphate double salt ($NiSO_4(NH_4)SO_4$), leaving cobalt (III) pentammine sulphate in solution. After the second stage of nickel removal, the cobaltic solution was essentially nickel-free, with a Co-Ni ratio greater than 1000:1. The cobalt (III) ion was reduced to cobalt (II) and acid was added to adjust the $NH_3$:Co mole ratio to about 2:1. This solution was treated with hydrogen at elevated temperature and pressure to produce cobalt metal powder containing less than 0.1% Ni. This two-stage nickel removal process, as described in U.S. Pat. No 2,822,264, produced cobalt powder with a Co:Ni ratio of greater than 1000:1.

This cobalt-nickel separation process is particularly suitable for the treatment of mixed nickel-cobalt sulphides with Ni:Co ratios of about 1:1. As the nickel content of the sulphide increases, the process becomes less viable technically and economically, since the amount of nickel double salt to be precipitated and recycled to the nickel circuit increases, whilst the cobalt concentration in the purified solution decreases. In practice, a Ni:Co ratio of about 3:1 is the maximum that can be handled in this process. It will be appreciated, therefore, that neither of the above-described existing nickel-cobalt sulphide refining processes is suitable for the treatment of nickel-cobalt sulphides with Ni:Co weight ratios in the range 3:1 to 20:1.

When limonitic nickel laterite ores are treated by high temperature sulphuric acid pressure leaching, the dissolved nickel and cobalt are both recovered in high yields as a mixed sulphide typically containing about 55% Ni and 5% Co, i.e. with a Ni:Co ratio of about 10:1. This process is expected to become increasingly important economically in the future as the nickel mining industry switches to the treatment of laterite ores, as economically viable sulphide ore reserves are depleted. Material of this composition cannot be treated economically by either of the existing hydrometallurgical processes described supra.

Kerfoot, in U.S. Pat. No. 5,468,281, broadly teaches a process for producing cobalt powder from nickel-cobalt sulphides which involves precipitating the triple salt of cobalt (III) hexammine sulphate, nickel (II) hexammine sulphate and ammonium sulphate. More specifically, the nickel-cobalt sulphides are pressure leached in an ammoniacal ammonium sulphate solution at a temperature of at least 80° C. at an effective ammonia to metals molar ratio ranging between 5:1 to 6.5:1 to oxidize the nickel and cobalt sulphides to sulphates thereby producing an ammoniacal leach liquor in which dissolved cobalt is predominantly in the (III) oxidation state, and a leach residue. The leach liquor is separated from the leach residue. The leach liquor is then saturated with an effective amount of anhydrous ammonia and cooled to below 50° C. to thereby precipitate the triple salt comprising cobalt (III) hexammine sulphate, nickel (II) hexammine sulphate and ammonium sulphate. The leach liquor is passed to a nickel recovery circuit. The precipitated triple salt is recovered from the leach liquor and repulped with water to selectively leach nickel (II) hexammine sulphate and to produce a crystalline cobaltic (III) hexammine sulphate having a Co:Ni ratio of at least 100:1 and a nickel enriched leach liquor. The cobaltic (III) hexammine sulphate is recovered, dissolved in hot ammonium sulphate solution and cooled to precipitate recrystallized cobaltic (III) hexammine sulphate having a Co:Ni ratio of at least 1000:1, which is subsequently treated to produce cobalt powder therefrom.

This process has been in commercial operation for several years, having replaced the soluble cobaltic pentamine process described supra. Experience has shown, however, that in certain circumstances the losses of oxidized cobalt values in the ammoniacal ammonium sulphate leach residue, can vary widely in the range between 1 to 30 weight percent. Heretofore, efforts to recover the precipitated cobalt values using conventional wash solutions containing free ammonia and ammonium sulphate solution have proved unsuccessful.

SUMMARY OF THE INVENTION

It is a primary objective of the present invention to provide an improved hydrometallurgical process having enhanced cobalt recovery wherein the process involves the selective precipitation of the cobalt from an ammoniacal nickel-cobalt sulphide pressure leach liquor and specifically to enhance the recovery of cobalt values from the ammoniacal ammonium sulphate leach residue.

More specifically, it is an objective of the present to provide an improvement particular to the process of U.S. Pat. No. 5,468,281, the disclosures of which are hereby incorporated by reference. In this existing process, which is in current commercial operation, high purity cobalt powder is produced from nickel-cobalt sulphides, using a multi-stage process in which cobalt is separated from nickel by precipitating the triple salt of cobalt (III) hexammine sulphate, nickel (II) hexammine sulphate and ammonium sulphate from a pressure leach liquor containing both nickel and cobalt. The nickel-cobalt sulphides are pressure oxidation leached in an ammoniacal ammonium sulphate solution at a temperature of at least 80° C. at an effective ammonia to metals molar ratio ranging between 5:1 to 6.5:1 to oxidize the nickel and cobalt sulphides to sulphate thereby producing an ammoniacal leach liquor in which dissolved cobalt is predominantly in the (III) oxidation state, and an ammoniacal ammonium sulphate leach residue. The ammoniacal ammonium sulphate leach liquor is separated, by conventional thickening, from the ammoniacal ammonium sulphate leach residue. The ammoniacal ammonium sulphate leach residue is subjected to an aqueous ammonia and/or ammonium sulphate solution wash and discarded to tailings. The leach liquor is then saturated with an effective amount of anhydrous ammonia and cooled to below 50° C. to thereby precipitate the triple salt comprising cobalt (III) hexammine sulphate, nickel (II) hexammine sulphate and ammonium sulphate. The leach liquor is passed to a nickel recovery circuit. The precipitated triple salt is recovered from the leach liquor and repulped with water to selectively leach nickel (II) hexammine sulphate and to produce a crystalline cobaltic (III) hexammine sulphate having a Co:Ni ratio of at least 100:1 and a nickel enriched leach liquor. The cobaltic (III) hexammine sulphate is recovered, dissolved in hot ammonium sulphate solution which is cooled to precipitate recrystallized cobaltic (III) hexammine sulphate having a Co:Ni ratio of at least 1000:1, which is subsequently treated to produce cobalt powder therefrom.

In accordance with the present invention, the improvement comprises the expedient of substituting the ammoniacal ammonium sulphate leach residue aqueous ammonia solution wash, or ammonium sulphate solution wash, with an ammonium carbonate solution repulp wash to thereby obtain recovery of cobalt values in said residue and thus enhanced overall cobalt recovery over the existing process.

The present improvement is founded on the discovery that in the presence of increased levels of calcium in the ammoniacal pressure leach or nickel-cobalt sulphide feed, an insoluble double salt, of cobalt (III) hexammine sulphate and calcium sulphate is formed and reports in the residue. By providing an ammonium carbonate repulp leach of the leach residue, the cobaltic hexammine sulphate is redissolved and calcium carbonate precipitated, it is believed without being bound by same, in accordance with the following reaction:

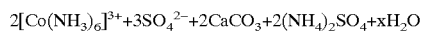

wherein x is 2, 4 or 6.

Advantageously, utilization of the improvement disclosed herein, provides an increased recovery of greater than about 90 percent of the precipitated cobaltic hexammine salt which would, potentially, using the '281 process, have been otherwise lost to tailings.

Broadly stated, the invention is in a process for producing cobalt metal powder from nickel-cobalt sulphides comprising leaching said nickel-cobalt sulphides in an ammoniacal ammonium sulphate solution under an elevated pressure of an oxygen bearing gas, at a temperature of at least 80° C., with an effective ammonia to metals mole ratio in the range of 5:1 to 6.5:1 to oxidize the nickel and cobalt sulphides to sulphates, and to produce an ammoniacal leach liquor in which dissolved cobalt is predominantly in the (III) oxidation state, and a leach residue containing a cobalt (III) hexammine sulphate calcium sulphate double salt, separating the leach liquor from the leach residue, saturating the leach liquor with an effective amount of anydrous ammonia and cooling the ammoniated leach liquor to below 50° C., whereby the triple salt of cobalt (III) hexammine sulphate, nickel (II) hexammine sulphate and ammonium sulphate is precipitated, recovering the precipitated triple salt from the leach liquor, repulping the triple salt with an effective amount of water to selectively leach nickel(II) hexammine sulphate and to produce a crystalline cobalt (III) hexammnine sulphate with a Co:Ni ratio of at least 100:1 and a nickel enriched leach liquor, redissolving the cobalt (III) hexammine sulphate in hot ammonium sulphate solution, and cooling the solution to precipitate recrystallized cobalt (III) hexammine sulphate having a Co:Ni ratio of at least about 1000:1 and treating the recrystallized cobalt (III) hexammine sulphate to produce cobalt metal therefrom, the improvement comprising: repulping said ammoniacal ammonium sulphate leach residue, containing the cobalt (III) hexammine sulphate-calcium sulphate double salt, with a solution containing an effective amount of ammonium carbonate to thereby redissolve the cobalt (III) hexammine sulphate and precipitate calcium carbonate; and separating the repulp leach liquor from the repulp leach residue.

DESCRIPTION OF THE PREFERRED EMBODIMENT

Figure 1:
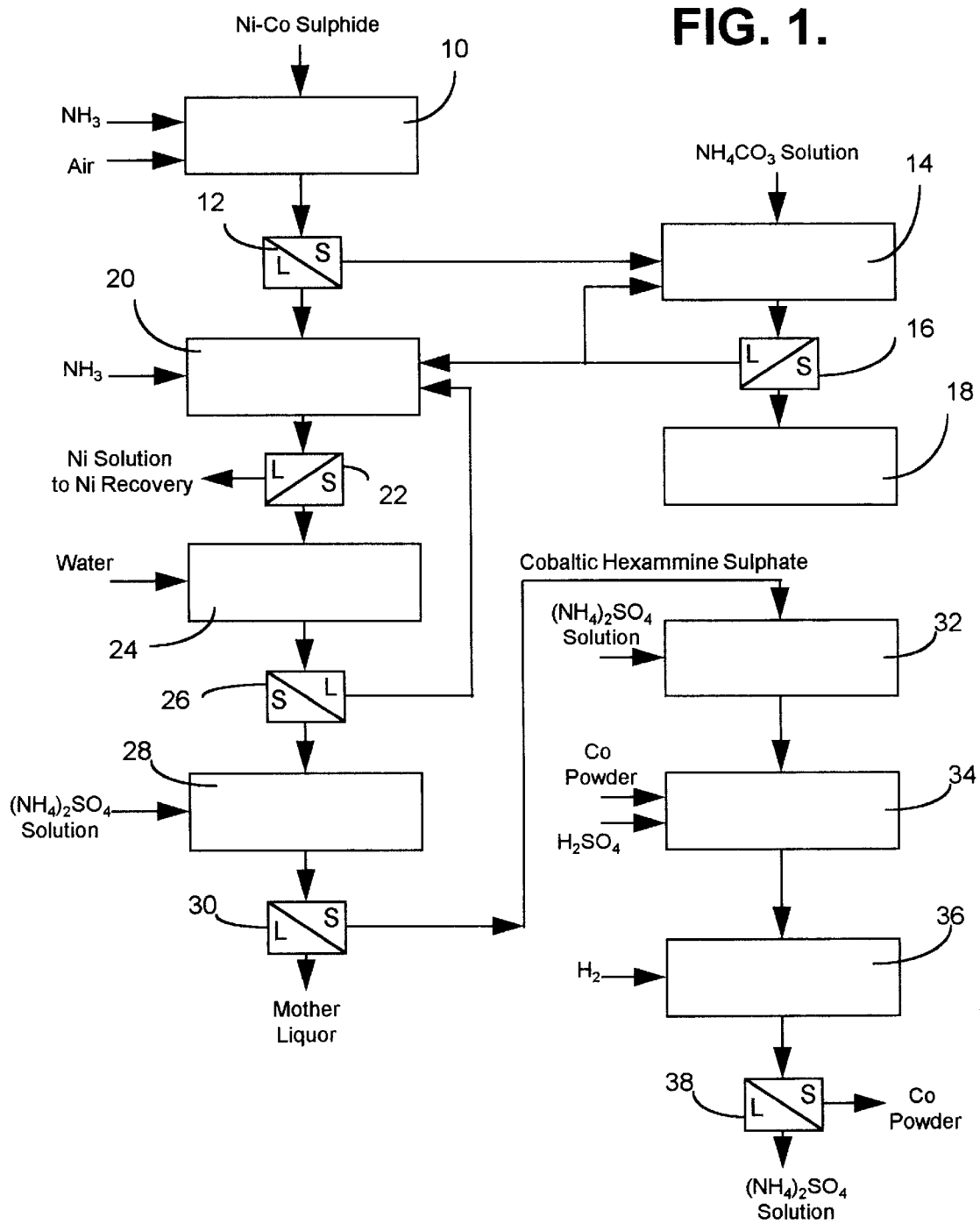
FIG. 1 is a schematic flowsheet of a preferred embodiment of the process.

Mixed nickel-cobalt sulphides in a finely divided state are first pressure leached in a conventional ammoniacal ammonium sulphate pressure leach 10, under elevated air pressure of at least 500 kPa, at a temperature of at least 80° C., to oxidize the nickel and cobalt sulphides to the corresponding sulphates. The ammonium sulphate concentration is maintained in the range 150 to 250 g/L and the titratable ammonia concentration is adjusted to maintain the titratable ammonia to divalent metal mole ratio in the range 5:1 to 6.5:1, preferably at about 6:1 to maximize the formation of the hexammine complex ions of nickel (II) and cobalt (III). The leach solution produced will typically contain from 20 to 100 g/L nickel and from 4 to 20 g/L cobalt.

After liquid-solid separation 12 of the ammoniacal pressure leach 10, to the leach residue containing residual cobalt in what is believed to be the form of a double salt of cobaltic hexamine sulphate-calcium sulphate, together with insoluble iron oxide and gangue, is added an ammonium carbonate solution containing in the range of about 10 g/L to 50 g/L to thereby redissolve cobaltic hexammine sulphate and precipitate calcium carbonate in the repulp leach 14. After liquid-solid separation 16, the leach liquor, typically having up to 20 g/L cobalt in solution is combined with the original ammonial pressure leach solution prior to ammoniation in step 20. The repulp leach residue is passed to tailings 18 for disposal thereof. Alternatively, an ammoniacal solution obtained from the ammonia scrubber in the existing plant (the origins of which are not detailed herein) which contains both ammonium ions and carbonate ions therein may be utilized, the desired molar ratios of ammonium ions and carbon dioxide concentrations being formulated in accordance with procedures well known to those skilled in the art.

The leach liquor from the ammoniacal pressure leach 10 in combination with the repulp liquor is saturated with ammonia to increase the titratable ammonia concentration to the range 170 to 190 g/L, and cooled to below 50° C., in triple salt precipitation 20.

Under these conditions a crystalline triple salt, containing cobalt (III) hexammine sulphate, nickel (II) hexammine sulphate, and ammonium sulphate, with a Co:Ni ratio of about 1:1 is precipitated, typically leaving about 2 g/L Co with 15 to 70 g/L Ni in solution. This solution is suitable for treatment by prior art processes, to produce nickel powder meeting market specifications for cobalt content. The residual cobalt in the nickel solution passes through the nickel powder reduction step, and is precipitated with hydrogen sulphide as a nickel-cobalt sulphide with a Ni:Co ratio of about 1:1 in a sulphide precipitation step, not shown. This sulphide is recycled as an additional feed to the ammonia pressure leach 10.

The triple salt, which is recovered by filtration 22 from the cooled liquor, is repulped with a controlled amount of water, and is leached at about 20° C., in water leach 24 to selectively leach nickel hexammine sulphate, as well as other trace metals such as copper, zinc and cadmium, to produce a crystalline cobaltic hexammine sulphate, with a Co:Ni ratio of 100:1 or higher. The crystalline salt is separated from the leach liquor by filtration 26. The leach liquor which typically contains 50 to 65 g/L Ni and 10 to 15 g/L Co, with 100 to 120 g/L titratable $NH_3$, is recycled to the triple salt precipitation step 20 where most of the cobalt is reprecipitated, and the soluble nickel is returned to the nickel circuit. The cobaltic hexammine sulphate is recovered by liquid solid separation 26 and is further upgraded by recrystallization in step 28 wherein the salt is dissolved in hot ammonium sulphate solution and is reprecipitated by cooling to yield a cobaltic hexammine sulphate product with a Co:Ni ratio of 1000:1 or higher. The mother liquor is recycled to ammonia pressure leach 10 and the purified cobalt salt forms the feed for the production of cobalt metal or cobalt chemicals, using known prior art processes. For the production of cobalt powder by hydrogen reduction, for example, the purified salt is recovered by liquid-solid separation 30 and redissolved in hot ammonium sulphate solution in redissolution step 32, and is then treated with cobalt powder to reduce Co(III) to Co(II), and treated with sulphuric acid to adjust the ammonia:cobalt mole ratio to about 2:1, in conversion step 34. This solution then forms the feed to the cobalt reduction step 36, in which cobalt powder is produced using hydrogen at elevated temperature and pressure, and is separated from the ammonium sulphate solution by liquid-solid separation 38. Alternatively, the purified cobaltic hexammine sulphate can be pyrolysed to cobalt (II) sulphate, or cobalt oxides.

The process of the invention is further illustrated having reference to the following non-limitative examples.

EXAMPLE 1

This example illustrates the precipitation of the cobalt-calcium double salt in the ammoniapressure leaching of nickel-cobalt sulphides. Standard ammonia pressure leach batch tests were conducted on samples of nickel-cobalt sulphides with increasing levels of calcium (added as solid gypsum). The analyses of the leach solution and solids after 3h of leach time illustrate the influence of gypsum in the leaching process. The precipitation of cobaltic hexammine sulphate to give cobalt rich residues and cobalt-depleted solutions is demonstrated to be dependent on the quantity of calcium present as shown in Table I herebelow.

TABLE I

| 3 h Filtrate Analysis g/L | Calcium Addition (as $CaSO_4.2H_2O$) | | | |
|---|---|---|---|---|
| | 0 | 5 g/L | 10 g/L | 15 g/L |
| Co | 7.2 | 4.9 | 2.6 | 0.69 |
| Co as Co-hex | 5.1 | 2.9 | 0.48 | 0.20 |
| Ni | 75.7 | 67.8 | 76.1 | 68.0 |
| Zn | 1.7 | 1.7 | 1.8 | 1.9 |
| $NH_3f$ | 125 | 133 | 129 | 137 |
| Solids Analysis, % | | | | |
| Co | 3.8 | 6.6 | 7.3 | 6.3 |
| Ca | <0.2 | 5.1 | 12.5 | 12.0 |
| Ni | 34.2 | 34.8 | 3.5 | 13.5 |
| Fe | 11.0 | 2.9 | 1.8 | 1.1 |

EXAMPLE 2

This example illustrates the extraction of cobalt by ammonium carbonate leaching from a leach residue, from the ammoniacal pressure leaching of a Ni—Co sulphide, which contained a substantial amount of the cobalt-calcium double salt. Approximately 180 g of pressure leach residue was repulped at 80° C. for 20 minutes in two litres of a solution containing 50 g/L ammonium carbonate and 100 g/L ammonium sulphate. After this treatment, the washed and dried residue weighed 117 g, corresponding to a weight loss of 38%. Almost 75% of the cobalt content of the pressure leach residue dissolved. The detailed compositions of the feed solids and the product residue and solution are given in the following table.

TABLE II

| Analysis | Leach Residue | Washed residue | Wash Solution |
|---|---|---|---|
| | Weight % | | g/L |
| Ni | 1.51 | 1.9 | 0.13 |
| Co | 5.14 | 2.05 | 3.45 |
| Ca | 6.13 | 8.8 | 0.08 |
| Cu | 0.42 | 0.31 | — |
| Fe | 13.6 | 20.6 | 0.03 |
| Zn | <0.02 | <0.02 | 0.01 |
| S | 14.9 | 12.5 | — |

The commercial benefit of this invention is illustrated in the following Table III, which presents the estimated loss of cobalt recoveries for a refinery processing nickel-cobalt sulphides with increasing calcium content, for two cases: with, and without the ammonium carbonate repulp leach.

TABLE III

| % Ca in | % Co lost due to Precipitation as Co-Ca Salt | |
|---|---|---|
| Ni-Co Sulphide | Without Carbonate Repulp | With Carbonate Repulp |
| 0.5 | 6.6 | 1.0 |
| 1.0 | 19.7 | 3.9 |
| 1.5 | 32.8 | 6.6 |

It will be understood that other embodiments and examples of the invention will be readily apparent to a person skilled in the art, the scope of the invention being defined in the appended claims.

I claim:

1. In a process for producing cobalt metal powder from nickel-cobalt sulphides comprising leaching said nickel-cobalt sulphides in an ammoniacal ammonium sulphate solution under an elevated pressure of an oxygen bearing gas, at a temperature of at least 80° C., with an effective ammonia to metals mole ratio in the range of 5:1 to 6.5:1 to oxidize the nickel and cobalt sulphides to sulphates, and to produce an ammoniacal ammonium sulphate leach liquor in which dissolved cobalt is predominantly in the (III) oxidation state, and an ammoniacal ammonium sulphate leach residue containing a cobalt (III) hexannmine sulphate-calcium sulphate double salt, separating the ammoniacal ammonium sulphate leach liquor from the ammoniacal ammonium sulphate leach residue, saturating the ammoniacal ammonium sulphate leach liquor with an effective amount of anydrous ammonia and cooling the ammoniated leach liquor to below 50° C. to precipitate the triple salt of cobalt (III) hexammine supbate, nickel (II) hexammine sulphate and ammonium sulphate, recovering the precipitated triple salt from the leach liquor, repulping the triple salt with an effective amount of water to selectively leach nickel(II) hexammine sulphate and to produce a crystalline cobalt (III) hexammine sulphate with a Co:Ni ratio of at least 100:1 and a nickel enriched leach liquor, dissolving the cobalt (III) hexammine sulphate in hot ammonium sulphate solution, and cooling the solution to precipitate recrystallized cobalt (III) hexammine sulphate having a Co:Ni ratio of at least about 1000:1 and treating the recrystallized cobalt (III) hexammine sulphate to produce cobalt metal therefrom, the improvement comprising:

repulping said ammoniacal anuonium sulphate leach residue, containing the cobalt (III) hexammine sulphate-calcium sulphate double salt, with a solution containing an effective amount of ammonium carbonate to dissolve the cobalt (III) hexammine sulphate in the repulp leach liquor and precipitate calcium carbonate; and separating the repulp leach liquor containing cobalt (III) hexammine sulphate from the repulp leach residue containing calcium carbonate.

2. The process as set forth in claim 1 wherein said effective amount of ammonium carbonate ranges between about 10 g/L to 100 g/L.

3. The process as set forth in claim 1 wherein the separated repulp leach liquor containing said cobalt (III) hexammine sulphate is recycled to said repulping.

4. The process as set forth in claim 3 wherein said effective amount of anuonium carbonate ranges between about 10 g/L to 100 g/L.

5. The process as set forth in claim 3 wherein said repulp leach liquor containing said cobalt (III) hexamine sulphate is recycled to said triple salt precipitation.

6. The process as set forth in claim 5 which further comprises treating the recrystallized cobalt (III) hexammine sulphate by dissolution in hot ammonium sulphate solution, treating the said hot ammonium sulphate solution containing dissolved cobalt (III) hexammme sulphate with an effective amount of cobalt powder to reduce Co(III) to Co(II) and treating the said hot ammonium sulphate solution containing Co(II) with hydrogen to produce cobalt powder therefrom.

7. A process as set forth in claim 6 wherein the ammoniacal leach liquor is saturated with an effective amount of ammonia by adding anhydrous ammonia or a solution of ammonium hydroxide to provide about 170 to 190 g/L tam titratable ammonia, in which the ammoniacal leach liquor contns about 150 to 250 g/L ammonium sulphate and in which the saturated leach liquor is cooled to a temperature in the range of 20° C. to 40° C.

8. A process as set forth in claim 7 wherein the precipitated triple salt is repulped with an effective amount of water at a rate to maintain the titratable ammonia concentration at about 100 to 120 g/L.

9. A process as set forth in claim 8 wherein the precipitated triple salt is repulped with an effective amount of water at a rate effective to maintain the titratable ammonia concentration at about 100 to 120 g/L and wherein the solution is maintained at a temperature in the range of about 20° to 40° C.

* * * * *